United States Patent [19]

Bigbee et al.

[11] 4,201,348

[45] May 6, 1980

[54] FEED GRINDING AND MIXING APPARATUS

[75] Inventors: Marvin L. Bigbee, Ankeny; Harold R. Lindstrom, Des Moines; Edward C. Ryan, Ankeny, all of Iowa

[73] Assignee: Deere & Company, Moline, Ill.

[21] Appl. No.: 901,578

[22] Filed: May 1, 1978

[51] Int. Cl.² .......................................... B02C 13/286
[52] U.S. Cl. ............................. 241/101 B; 241/101.7; 241/186 R; 366/321; 366/323; 366/603
[58] Field of Search ............... 366/603, 321, 319, 323; 241/101 B, 101.2, 101.5, 101.6, 101.7, 186 A, 186 R; 198/661, 669

[56] References Cited

U.S. PATENT DOCUMENTS

| | | | |
|---|---|---|---|
| 2,894,733 | 7/1959 | Wosmek | 366/603 X |
| 3,129,927 | 4/1964 | Mast | 366/603 X |
| 3,369,762 | 2/1968 | Buzenberg et al. | 366/603 X |
| 3,524,730 | 8/1970 | Yokouchi et al. | 366/323 X |
| 4,092,004 | 5/1978 | Leverenz et al. | 241/101 BX |

Primary Examiner—Mark Rosenbaum

[57] ABSTRACT

A grinder-mixer having a trough-shaped mixing tank, a horizontal transfer and mixing auger seated along the bottom of the tank and extending into the hammer mill, and a vertical auger in the tank for elevating the material for recirculation or discharge. Mixing capacity is increased with the larger tank and bridging of material is minimized with steeply inclined tank walls, a centrally mounted agitator and the trough-mounted mixing auger. Power train demands are reduced through utilizing only two auger conveyors to transfer material from the hammer mill, mix it in the tank and elevate it for recirculation or discharge. Improved intermixing is provided through stepped pitch flights provided on the horizontal mixing auger.

12 Claims, 3 Drawing Figures

FEED GRINDING AND MIXING APPARATUS

BACKGROUND OF THE INVENTION

The present invention relates generally to an agricultural mixing apparatus and more particularly to a grinder-mixer having a trough-shaped tank and two augers for transferring and intermixing material.

Existing agricultural grinder-mixers typically reduce feed material to a particular size, transfer it to a mixing tank wherein various feed additives are introduced and then mix and recirculate the feed and additives in preparation for discharge into hog self feeders, cattle feed bunkers or a feed storage container. Such implements usually include a mixing tank, material-reducing mill, feed additive hopper connected with the tank and several auger conveyors including a first transfer auger for moving material from the reducing mill to the tank, a second auger for moving material from the additive hopper to the tank, a third auger for elevating the material within the tank and a fourth auger for unloading material from the tank. Many machines require three additional augers to move material and deposit it into hog self feeders, cattle feed bunkers or feed storage containers.

In operation, these grinder-mixers first process the material in a hammer mill or similar unit and then transfer it to the mixing tank. Feed additives introduced by the farmer or operator into the additive hopper are also conveyed to the mixing tank. The mixing tank contains a vertical auger adapted to receive material at its lower portion, elevate it and discharge it back into the tank wherein it settles again to the bottom and is again recirculated by the vertical auger. After the ground materials and additives are completely intermixed, the unloading auger conveyor transfers the material from the tank and to feed bunkers or other appropriate storage containers.

Conventional grinder-mixers include tank configurations similar to the conical, cylindrical and flat-sided tanks illustrated respectively in U.S. Pat. No. 3,840,189 to Kaniengieter et al issued Oct. 8, 1974, U.S. Pat. No. 3,667,734 to Skromme et al issued June 6, 1972 and U.S. Pat. No. 2,894,733 to Wosmek issued July 14, 1959. A problem sometimes encountered during operation with grinder-mixers having downwardly converging tanks such as illustrated in Kaniengieter and Wosmek is that certain material may bridge as it settles in the lower portion of the tank. This occurs since the cross-sectional area of the tank decreases as the walls converge inwardly and the settling material becomes compressed resulting in a solid bridge of material being accumulated between the tank wall and the auger housing carried in the center of the tank. When a bridge is formed, other material is prevented from settling and eventually a void forms around the inlet area of the vertical mixing auger thereby requiring that the mixing process be stopped until the bridge of material is loosened. As a result, productivity and capacity are reduced. The bridging problem is overcome for the most part in the cylindrical tank configuration illustrated in Skromme et al. Nevertheless, material occasionally compacts around the lower tank walls outwardly of and below the sweeping and cleaning blade. Torque requirements for driving the sweep blade are then increased and material flow through the inlet and outlet openings in the bottom of the tank is reduced.

A further problem with existing grinder-mixers results from the multiple mixing and transfer augers or conveyors utilized. To operate several conveyors, a substantial power train structure capable of transmitting the necessary power to each conveyor must be provided and thus the initial manufacturing and later maintenance expenses are increased.

SUMMARY OF THE INVENTION

It is accordingly the primary object of the present invention to provide a mixing apparatus having none of the aforementioned problems. To increase the intermixing capacity, a larger trough-shaped mixing tank has been provided. To reduce manufacture and maintenance expenses, only two conveyors are utilized to transfer, mix and elevate material for discharge. To better insure mixing of the material and avoid bridging, an agitator is utilized in the tank and the material transfer capacity of the mixing auger is varied.

More specifically, it is an object to increase the mixing tank capacity through providing a larger tank and a mixing apparatus that minimizes bridging. Bridging is reduced through providing steeply inclined tank walls, an agitator in the center of the tank and a variable capacity mixing auger along the trough-shaped bottom of the tank.

It is further an object to minimize the number of moving parts utilized in the implement. Toward this end, a horizontal mixing auger is utilized and also serves to transfer additives and reduced material from the hammer mill to the tank. A vertical conveyor serves to elevate material for recirculation within the tank or discharge to the unloading conveyor.

It is further an object to provide improved mixing within the tank. The horizontal auger is provided with stepped pitch flights so as to draw material downwardly from the tank while it also conveys material towards the elevating auger. The agitator slowly rotates above the horizontal auger to better intermix the material and prevent cavitation.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
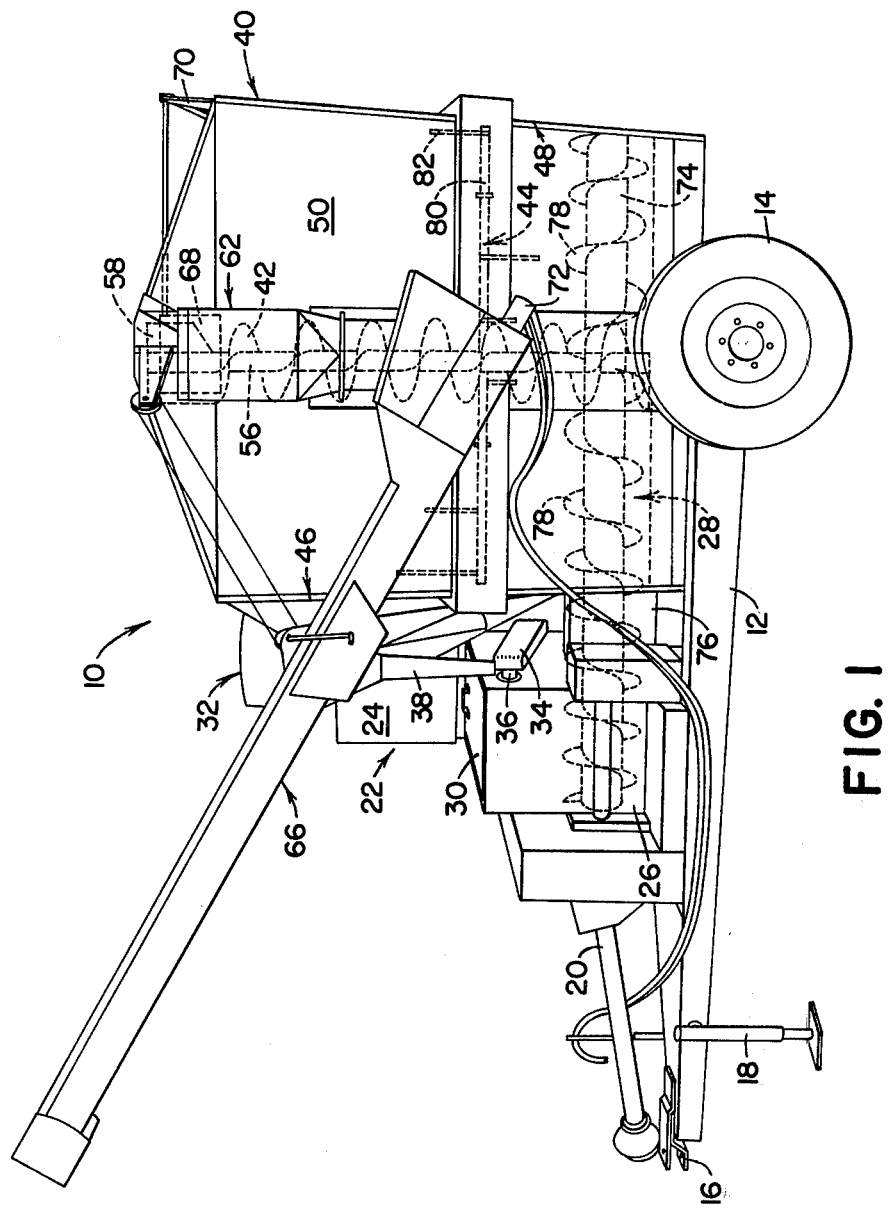
FIG. 1 is a perspective view of a portable combination grinder-mixer incorporating the mixing apparatus of the present invention.

The improved grinder-mixer implement shown in FIG. 1 is a portable implement 10 adapted to be towed by a tractor and to utilize the tractor power take-off for powering its reducing mill and material mixing apparatus. The grinder-mixer 10 includes a frame structure 12 which is supported on wheels 14 carried at its sides. At the forward end of the frame 12 and indicated by the numeral 16 is a hitch for connecting the frame 12 with the tractor. Also illustrated at the forward end of the frame 12 is a support stand 18 for maintaining the grinder-mixer 10 in a generally horizontal position when disconnected from the tractor. Carried above and at the forward end of the frame 12 is a drive shaft 20 adapted to be connected to the power take-off of a tractor fo drivingly rotating the various transfer and mixing augers of the implement 10 hereinafter discussed.

Directly to the rear of the drive shaft 20 is the hammer mill or material-reducing unit indicated generally by the number 22. The hammer mill 22 contains a rotor assembly (not shown) and is adapted to receive feeds through the door in housing 24. The material deposited in the hammer mill 22 is reduced by rotating hammers until it is small enough to pass through holes in a screen (not shown) positioned adjacent the trough 26 which houses the horizontal auger 28. Directly over the horizontal auger 28 and comprising part of the housing containing the hammer mill 22 is a door 30 which can be raised to change screens. Additionally, feed additives can be introduced through this opening. To provide a more convenient and accessible additive opening, a hopper can be added to the rear of the tank 40.

A cyclone-type dust remover 32 is positioned directly to the rear of the hammer mill 22 and includes a suction fan (not shown) for removing dust laden air from the hammer mill chamber, directing it through the ducts 34 and 36 and discharging it through the vertical tube 38 leading into the dust collector 32. The fine dust particles generated in the hammer mill operation are removed in the collector 32 and settle back into the auger trough 26 to be delivered with the heavier ground material to the mixing tank 40.

Figure 2:
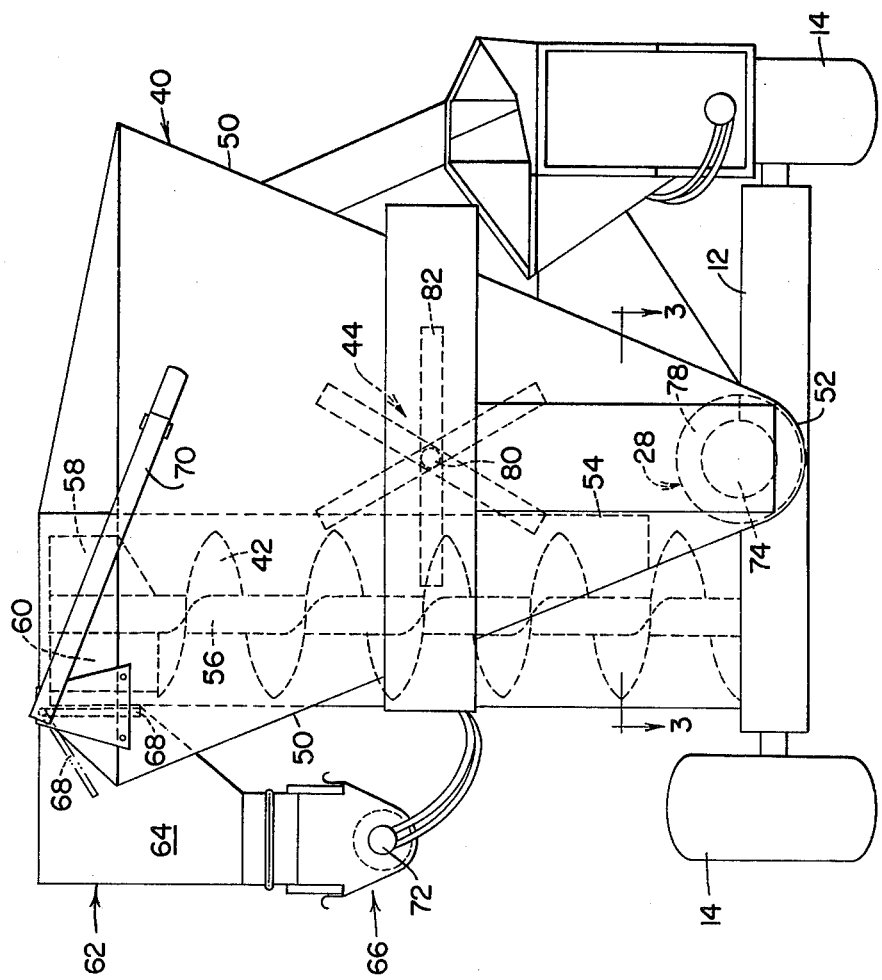
FIG. 2 is an enlarged rear view of the grinder-mixer.

Material is intermixed in the mixing tank 40 by the horizontal auger 28, vertical auger conveyor 42 and an agitator 44. The trough-shaped mixing tank 40 is viewed best in FIGS. 1 and 2 and has a generally rectangular form when observed in the plan view. The tank 40 has upright end walls 46 and 48 and steeply sloped downwardly converging side walls 50 forming a fore-and-aft extending horizontal trough bottom 52. The vertical auger 42, best viewed in FIG. 2, is offset to one side of the bottom of the mixing tank 40 and is carried in an upright tubular housing 54 supported at its lower portion on the frame and at its upper portion within the tank 40. The auger housing 54 is centrally located in the tank 40 with respect to its fore-and-aft dimension and terminates at its upper and lower ends short of the top and bottom of the tank 40. Supported within the tubular housing 54 is the vertical mixing auger 42. This auger 42 extends beyond the tubular housing 54 at its lower end so as to receive material from the tank 40 and projects above the housing 54 at its upper end so as to discharge material back into the tank 40. At the upper end of the auger 42 and carried rigid with its core 56 are a pair of flat, radially extending paddle surfaces 58 and 60 for deflecting elevated material away from the auger 42. A discharge chute 62 having vertically extending side walls 64 and a horizontal top is mounted at the top of the mixing tank 40 adjacent to the vertical auger 42. The chute 62 includes a downwardly opening throat to which is connected a discharge auger 66 rotatable about its connection to the chute 62. Closing the entrance to the chute 62 is a swingable gate 68 controlled by a manually activated lever 70. As the gate 68 is shifted from a closed to an opened position, material deflected from the paddles 58 and 60 of the vertical auger 42 is permitted to enter the chute 62 and be unloaded by the discharge auger 66. The discharge auger is provided with a hydraulically driven motor 72 to further reduce the power train torque requirements.

Figure 3:
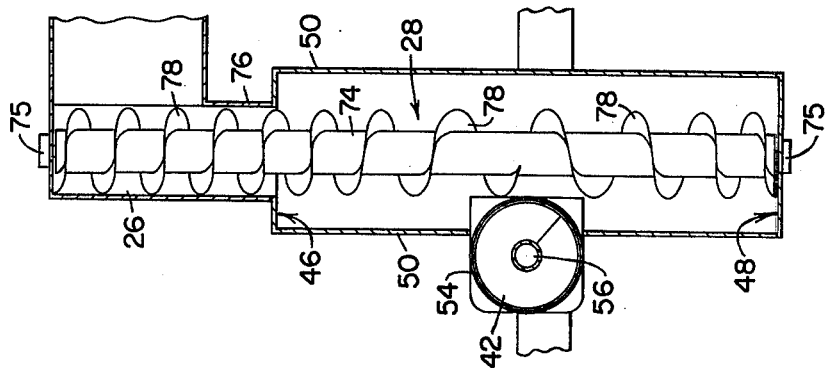
FIG. 3 is an enlarged and partial plan view illustrating the horizontal transfer and mixing auger and the vertical elevating auger.

The horizontal mixing and transfer auger 28 includes a core tube 74 supported at its ends in appropriate bearings 75 carried in the rearwardly end wall 48 of the tank 40 and the forwardly end wall of the material-reducing unit 22. The horizontal auger 28, as viewed in FIG. 2, is carried in the trough bottom 52 of the mixing tank 40 and extends between its two upright end walls 46 and 48. The forward end of the horizontal auger 28 projects through the forward end wall 46 of the mixing tank 40, has its forward end projecting into the hammer mill 22 and is enclosed between the hammer mill 22 and tank 40 in a sheet metal housing 76. The auger 28 includes flights 78 having reversed pitch for conveying material from the ends of the horizontal auger 28 towards the vertical auger 42. In the preferred embodiment, the flights 78 are of varied pitch having a lesser pitch nearer the upright end walls 46 and 48 of the mixing tank 40 than adjacent the upright auger 42. The pitch of those flights 78 contained within the hammer mill 22 and outside the mixing tank 40 are generally the same as those adjacent the inside surface of the upright end walls 46 and 48. As best shown in FIG. 3, the preferred embodiment includes a horizontal auger 28 having a stepped pitch along its length so as to assure vertical feeding of the material within the tank 40 downwardly and into the horizontal auger 28 along its full length. The vertical auger 42 is designed to have a material carrying capacity per unit of time in excess of that of the horizontal auger 28 adjacent the lower end of the vertical auger in order to assure recirculation of the material.

While sufficient horizontal auger capacity is assured in the preferred embodiment through stepping the pitch of the flights, a constant pitch could be utilized with flights of varying diameter to insure that increasing auger capacity is provided between the tank end walls 46 and 48 and the upright auger 42.

To further assure that the material flows downwardly and toward the horizontal auger 28 and to prevent bridging and cavitation, the agitator 44 is positioned above the auger 28. The agitator 44 includes a main shaft 80 with radially extending blades or arms 82 along its length.

The grinder-mixer 10 is driven during operation by a tractor PTO. To load the tank 40, material is fed through the opening in the housing of the reducing unit 22. It is then reduced to the desired size and passes into the trough housing 26 at the forward end of the horizontal auger 28. Dust particles generated in the hammer mill 22 are collected in the dust remover 32 and redeposited in the auger trough. Whatever additives are desired are deposited into the tank through the swingable door 30 or rear-mounted additive hopper and transferred by the horizontal auger 28 to the tank 40. As materials are processed in the reducing unit 22, they are conveyed by the horizontal auger 28 through the housing 76 and into the tank 40 and towards the vertical auger 42. Upon reaching the vertical auger 42, the material is collected on the flights of the vertical auger 42 and elevated within the housing 54 to the top of the auger 42 where the paddles 58 and 60 deflect it radially outwardly from the auger 42. When the gate 68 is closed, the material falls back into the tank 40. As the material settles, the agitator 44 continues to stir and intermix it assuring that it continues to flow downwardly to the horizontal auger 28 and does not bridge. The varied pitch of the flights along the horizontal auger 28 assures that the downwardly moving or settling material continues to feed to the horizontal auger 28. With a lesser pitch of the flights at the end walls 46 and 48 of the horizontal auger 28 than near the vertical auger 42, the rate of conveying of the material along the auger 28 is increased as the material nears the vertical auger 42 and assures that the horizontal auger 28 remains hungry along its length. As the vertical auger 42 elevates the material received from the horizontal auger 28 at a rate in excess of that rate of conveyance of the horizontal auger, the paddles 58 and 60 at the upper end of the vertical auger 42 deflect the elevated material radially outwardly, and when the gate 68 is opened, some of the material is discharged into the chute 62 for settling to the bottom of the discharge auger 66 carried at the side of the implement. The remaining material falls back into the tank for continued recirculation and mixing.

The discharge auger 66 can be pivoted about its connection with the discharge chute so as to be swingable from the front position illustrated in FIG. 1 to a rearwardly extending position or laterally extending position for unloading into a feed bunker or other self feeder. If so desired a slide chute instead of the auger 66 may be attached to the bottom of the discharge chute 62 for bunk feeding.

We claim:

1. In a material-mixing apparatus comprising: a mobile frame; a mixing tank having upright end walls and side walls converging to a trough-shaped bottom; an upright auger conveyor adapted at its lower end portion to receive material from the bottom of said tank intermediate its end walls and convey it upwardly for discharge into said tank; a material-reducing unit having an outlet for transferring material to the mixing tank; a generally horizontal auger means carried within the tank for conveying material towards the upright auger, said auger means adapted to receive material from near each end wall of said tank and also along its length and convey said material towards the upright auger conveyor, said auger means carried between the end walls and above and along the bottom of the mixing tank, one end of said auger means projecting through one end wall and the outlet and into the material-reducing unit, for moving material from said unit into the tank; and powered drive means carried by the frame for driving said upright auger conveyor and horizontal auger means.

2. In a grinder-mixer comprising a main frame; a material-reducing unit carried on said frame; a material container supported on the frame and having opposite ends joined by opposed side walls extending in diverging relation from opposite sides of a lower horizontal auger trough; a conveying and mixing auger seated in the trough having an intermediate portion between the end walls and flighting of opposite hands extending from the intermediate portion to opposite ends thereof, one end of which extends through its respective end wall to and for receiving and conveying material from the material-reducing unit, said flighting expanding its pitch from portions adjacent the end walls and said intermediate portion for receiving and conveying material throughout its length between the end walls; an upright auger including an auger housing supported on the frame and having an upper end within the container and a lower end offset horizontally to one side and in material-receiving relation to the intermediate portion of the horizontal auger; a discharge conveyor supported on the frame outboard of one of said side walls and on the same side of said horizontal auger as said upright auger; and transfer means for selectively diverting material from the upper end of the upright auger to the discharge conveyor.

3. In a material-mixing apparatus comprising: a mobile frame, a mixing tank having upright end walls and side walls converging to a trough-shaped bottom; an upright auger conveyor adapted at its lower end portion to receive material from the bottom of said tank intermediate its end walls and convey it upwardly; a discharge conveyor carried in material-receiving relation to the upright auger conveyor; a material-reducing unit having an outlet for transferring material to the mixing tank; a generally horizontal auger means carried within the tank for conveying material towards the upright auger, said auger means further adapted to receive material along its length and convey material towards the upright auger at rates increasing nearer the upright auger, said auger means carried between the end walls and above and along the bottom of the mixing tank, one end of said auger means projecting through one end wall and the outlet and into the material-reducing unit, for moving material from said unit into the tank; means at the upper end of the upright auger conveyor for directing upwardly conveyed material to either the tank or said discharge conveyor; and powered drive means carried by the frame for driving said upright auger conveyor, horizontal auger means and discharge conveyor.

4. The invention defined in claim 3 wherein the horizontal auger means conveys material towards the upright auger conveyor at a rate less than the latter conveyor moves material upwardly.

5. The invention defined in claim 3 wherein the pitch of the flights of the horizontal auger means adjacent the end walls of the tank is less than the pitch of the flights of said auger means adjacent the upright auger conveyor.

6. The invention defined in claim 3 wherein the means for directing upwardly conveyed material includes a pair of vertically disposed paddle surfaces carried by the upper end of said upright auger conveyor and a gate between said paddles and the discharge conveyor shiftable to direct material from said paddles to either the tank or said discharge conveyor.

7. The invention defined in claim 3 wherein the tank further includes therein a horizontally disposed agitator positioned over the horizontal auger means for mixing and stirring material within said tank.

8. In a material-mixing implement comprising: a mobile frame; a mixing tank having upright end walls and opposing side walls extending in converging relation to a trough-shaped bottom; a material-reducing unit and material discharge conveyor carried by the frame; an upright material elevating auger carried within the tank and having its lower portion in material-receiving relation with the trough-shaped bottom of said tank, said auger terminating at its upper portion within the tank and near the discharge conveyor; a horizontal auger means carried within and along the bottom of the tank adjacent the lower portion of the upright auger and projecting through one end wall of said tank and into the material-reducing unit, said auger means adapted to convey material from said unit into the tank and to receive material from the tank along its length and also from near each end wall of said tank and convey said material towards the upright auger; means for directing elevated material from the upright auger to either the tank or discharge conveyor; and powered means carried by the frame for driving the upright auger, horizontal auger means and the discharge conveyor.

9. In a material-reducing and mixing implement having a frame, a mixing tank with upright end walls and opposing side walls extending in converging relation to a trough-shaped bottom, a material-reducing unit and material discharge conveyor carried on said frame, the improvement comprising means for mixing the material including: an upright material elevating auger having its lower portion in material-receiving relation with the bottom of the tank and its upper portion within the tank and adjacent the discharge conveyor; a horizontal auger means mounted within the tank for receiving material along its length and moving said material from each end wall towards the upright auger, said horizontal auger means being adjacent to the lower portion of the upright auger, extending along the bottom of said tank and projecting out of one end wall of said tank and into the unit, said auger means having first and second sections of flight means to each side of the upright auger, the latter being closer to the upright auger and adapted to receive and convey material at a rate greater than the former; structure carried by the frame for directing material elevated by the upright auger to either the discharge conveyor or tank; and powered means on said frame for driving the upright auger, the horizontal auger means and the discharge conveyor.

10. The invention defined in claim 9 wherein the second sections of flight means each convey less material per unit of time over a given distance than does the upright auger.

11. In a grinder-mixer having a mobile frame, a material-reducing unit and a discharge conveyor carried on the frame, a mixing tank supported on the frame having substantially vertical end walls and converging side walls providing a trough-shaped bottom extending horizontally, one end wall having an opening therethrough, the improvement means for mixing and unloading material including: an upright material-conveying auger carried between the end walls and having its lower material-receiving portion near the bottom of said tank; a horizontally disposed auger means extending along the bottom of the tank adjacent the upright auger and projecting through the opening of said end wall into the reducing unit, said horizontal auger means having first and second flights spaced respectively to each side of the upright auger, said second flights being nearer the upright auger and adapted to receive and move material towards the upright auger at a rate greater than that of the first flights; a material mixing means positioned within the tank and above the horizontal auger means for stirring and mixing material above the latter means; material-deflecting structure carried at the upper portion of the upright auger for directing elevated material to either the tank or discharge conveyor; and powered means on said frame for driving the upright auger, horizontal auger means and discharge conveyor.

12. In a grinder-mixer: a mobile frame, a material-reducing unit carried on the frame; a discharge conveyor carried on the frame; a mixing tank having substantially vertical end walls and side walls diverging upwardly from a horizontal trough-shaped bottom; an upright auger housing positioned centrally within the tank; and upright auger mounted within the housing and operable to receive material from the tank at its lower portion, convey the material upwardly and discharge said material; a horizontally disposed auger seated in and extending along the trough-shaped bottom projecting through an opening in the end wall to the reducing unit, and having a portion intermediate the ends and flights of opposite hand extending to each side of the upright auger, said flights being reversed to shift material towards the latter auger and being of varied pitch to increase the material-receiving and conveying capacity of said horizontal auger nearer the upright auger, said capacity near the latter auger being less than that of the latter auger; a material-mixing agitator positioned within the tank above the horizontal auger and having a central shaft with a plurality of radially extending arms carried thereon for mixing and stirring the material carried in said tank; a material-deflecting structure carried at the upper portion of said upright auger and shiftable between a first and second position to divert elevated material to either the tank or discharge conveyor; and drive means connectible to a mobile power source for driving the upright auger, horizontal auger and discharge conveyor.

* * * * *

UNITED STATES PATENT OFFICE
CERTIFICATE OF CORRECTION

Patent No. 4,201,348     Dated 6 May 1980

Inventor(s) Marvin L. Bigbee, Harold R. Lindstrom & Edward C. Ryan

It is certified that error appears in the above-identified patent and that said Letters Patent are hereby corrected as shown below:

Column 7, line 38, after "improvement" insert -- comprising --.

Signed and Sealed this

Third Day of March 1981

[SEAL]

Attest:

RENE D. TEGTMEYER

Attesting Officer     Acting Commissioner of Patents and Trademarks